United States Patent [19]　[11]　4,336,715
Arnold et al.　[45]　Jun. 29, 1982

[54] TRANSDUCER MOUNT FOR WHEEL BALANCING MACHINES

[75] Inventors: Arthur K. Arnold; Donald R. Sherman, both of San Jose, Calif.

[73] Assignee: Autotron Equipment Corporation, Mountain View, Calif.

[21] Appl. No.: 297,730

[22] Filed: Aug. 31, 1981

Related U.S. Application Data

[63] Continuation of Ser. No. 128,946, Mar. 10, 1980, abandoned.

[51] Int. Cl.³ ............................................. G01M 1/22
[52] U.S. Cl. ........................................ 73/462; 73/475
[58] Field of Search .................................. 73/462–465, 73/475, 660; 310/338

[56] References Cited

U.S. PATENT DOCUMENTS 1,599,922  9/1926  Rathbone ......................... 310/338 X
3,320,580  5/1967  Sykes ............................... 310/338 X
3,992,931  11/1976  Tranquilla et al. .................. 73/465

Primary Examiner—James J. Gill
Attorney, Agent, or Firm—Flehr, Hohbach, Test, Albritton & Herbert

[57] ABSTRACT

A transducer mount for wheel balancing machines of the type having a rotatively driven shaft on which a wheel/tire assembly is mounted. There are two spaced apart bearing blocks that have bearings in which the shaft is supported. The bearing blocks are mounted within a square passageway formed by a rigid structural member. The bearing blocks are dimensioned so that there is a gap between their respective peripheries and the walls forming the passageway. A passive support member extends between the passageway and each of the bearing blocks. An active support also extends between the passageway and each of the bearing blocks, the active spacer including a piezoelectric element which generates a voltage representative of the imbalanced forces in the wheel/tire assembly.

4 Claims, 5 Drawing Figures

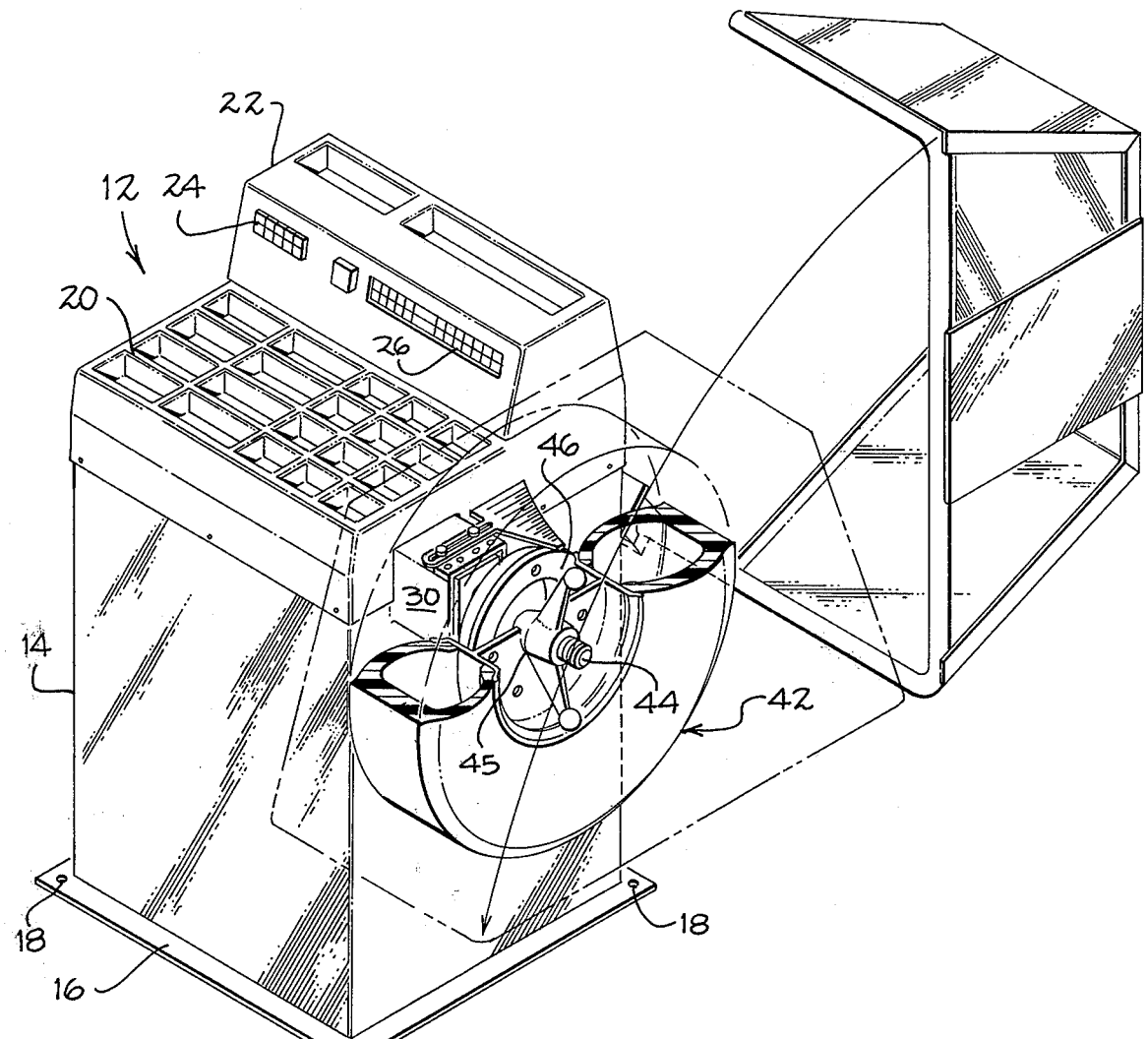
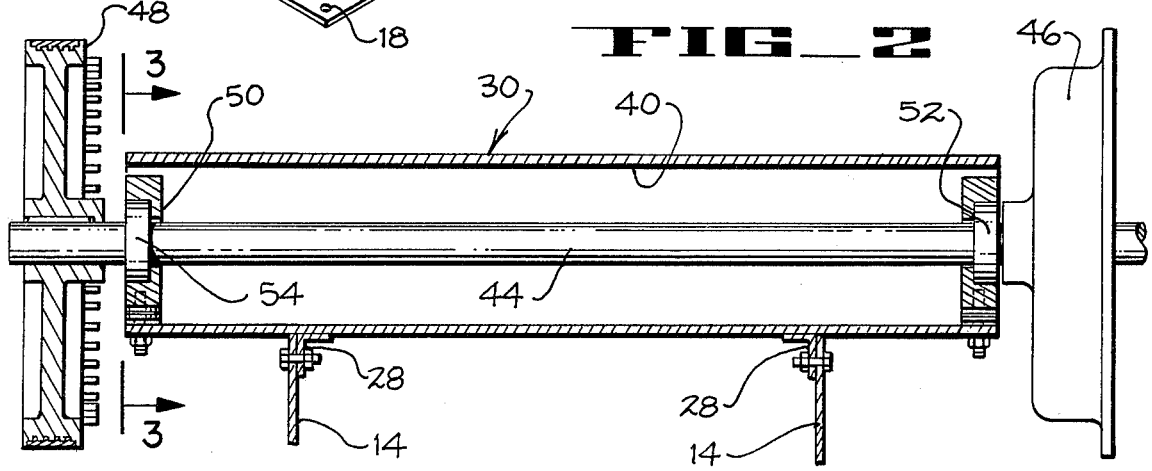

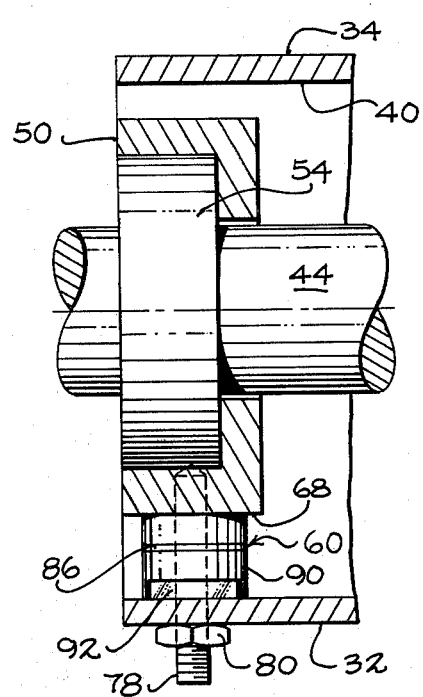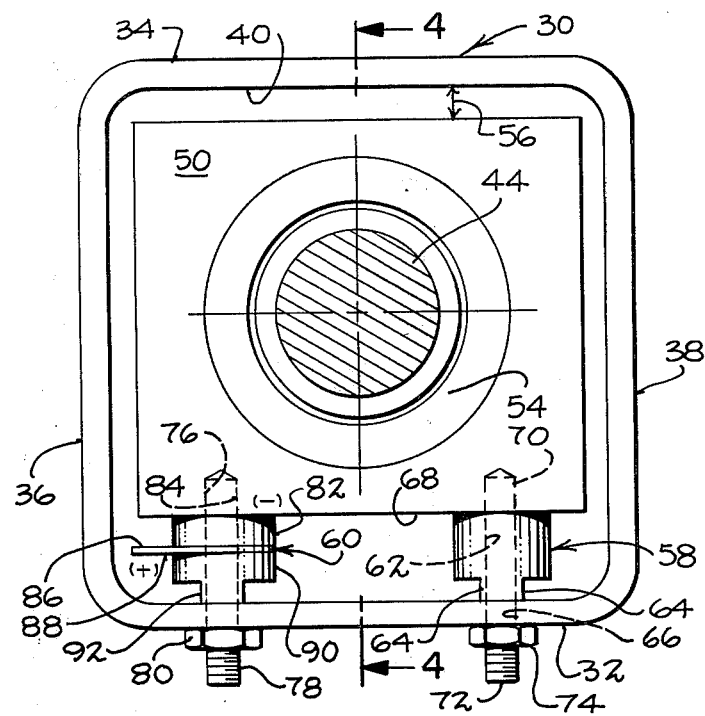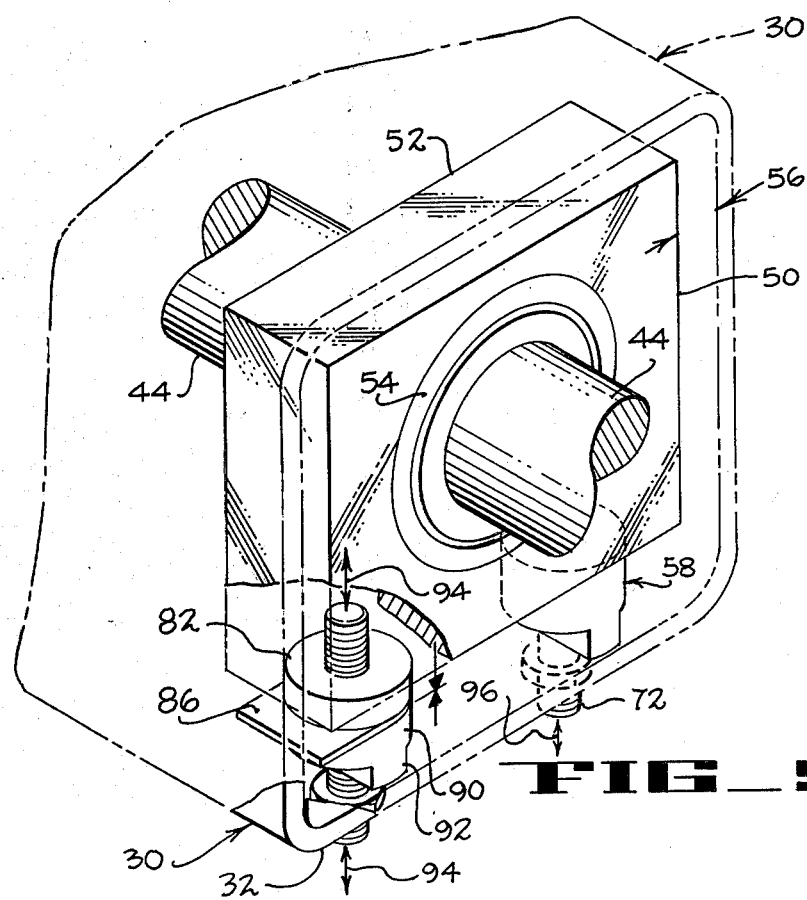

TRANSDUCER MOUNT FOR WHEEL BALANCING MACHINES

This is a continuation of application Ser. No. 128,946, filed Mar. 10, 1980, now abandoned.

BACKGROUND OF THE INVENTION

1. Field of the Invention

This invention relates to dynamic wheel balancing machines and more particularly to a transducer mount for sensing imbalanced forces present in a wheel/tire assembly.

2. Description of the Prior Art

The wheel balancing machine described in U.S. Pat. No. 3,636,773 typifies a balancing machine in general use. The patented structure includes a driven shaft on which a wheel/tire assembly is mounted. Associated with the shaft are two axially spaced transducers (identified by reference characters 42 and 43 in the patent disclosure) which, in response to rotation of the shaft and the wheel/tire assembly, produce electrical signals representative of the imbalanced forces in the assembly. From these electrical signals can be derived data indicative of the magnitude and location of the imbalanced forces which dictate the magnitude and location of balancing weights to counteract such imbalanced forces. The specific structure disclosed in the '773 patent is capable of giving satisfactory results but is unduly complex.

Other mounts for transducers in wheel balancing machines are shown in U.S. Pat. No. 3,910,121 (at 50 and 51 in FIG. 3) and U.S. Pat. No. 3,922,922 (at 11 and 12 in FIG. 2). The transducer mounts in these two cited prior art patents, although capable of producing satisfactory results, are unduly complex.

SUMMARY OF THE INVENTION

The specific form of the transducer mount that is described hereinafter includes an elongate rigid housing member in the form of a square box section steel shape. Interior of the housing member are supported two bearing blocks which have shaft supporting bearings therein. The blocks are mounted to the interior wall of the housing member by at least two spacers, one of which is a passive spacer and one of which is an active spacer. The passive spacer is typically formed of rigid material such as steel and is of cylindric form with a central bore. A bolt extends through the wall of the box beam housing member through the bore of the passive spacer and into threaded engagement with a tapped hole in the bearing block. The active spacer, which is preferably mounted in the same transverse plane as the passive spacer, includes a piezoelectric body, one surface of which contacts the bearing block and the other surface of which is provided with an electrode. The piezoelectric body is preferably cylindrical and defines a central bore. Associated with the piezoelectric body is a supplemental spacer body of similar cross sectional shape which has an axial dimension sufficient, when combined with the piezoelectric body, to span the gap between the bearing block and the internal wall of the box beam member. As in the case of the passive spacer a threaded stud is passed through a hole in the wall of the box beam member, the central bores of the supplemental spacer body and piezoelectric body into a threaded hole in the bearing block.

An object of the invention is to provide a transducer mount which utilizes a minimal number of parts so as to enhance longevity and minimize costs. This object is achieved by providing a central bearing block which is sized and shaped to form a gap with respect to the walls of the housing in which it is mounted and to support the bearing block by an active spacer which includes a piezoelectric element and at least one passive spacer.

Another object of the invention is to provide a transducer mount wherein the piezoelectric body can be accurately preloaded to any suitable degree. This object is achieved in accordance with the present invention because the mount includes a threaded stud having an externally accessible end with which a nut is engaged; the nut can be tightened from the exterior of the housing to effect any desired amount of preloading.

A feature and advantage of the present invention is that because of the few number of parts needed to fabricate and install the transducer mount, the cost of fabrication is reduced and the reliability of the structure is enhanced.

Another feature and advantage of the invention is that, in the unlikely event that replacement of any of the parts of the transducer mount is necessary, such can be effected rapidly because the transducer assembly includes a relatively small number of parts.

Still another object of the invention is to provide a transducer mount which combines accuracy and light weight. Accuracy is enhanced by assuring that forces imposed on the transducers arise from imbalanced forces in the wheel/tire assembly and not from deformation of parts of the machine. The prior art practice in avoiding deformation is to construct machines from massive parts; in contrast, the present invention employs a standard tubular or box shaped member which has inherent rigidity and light weight.

The foregoing, together with other objects, features and advantages, will be more apparent after referring to the following specification and the accompanying drawings.

BRIEF DESCRIPTION OF THE DRAWINGS

FIG. 1 is a perspective view of a wheel balancing machine equipped with the transducer mount of the invention.

FIG. 2 is a cross-sectional view through a vertical plane midway of the housing and shaft.

FIG. 3 is a cross-sectional view taken along line 3—3 of FIG. 2.

FIG. 4 is a cross-sectional view taken along line 4—4 of FIG. 3.

FIG. 5 is a partially diagrammatic isometric view of a transducer mount according to the invention and depicting the forces to which it is subjected during operation.

DETAIL DESCRIPTION OF A PREFERRED EMBODIMENT

Referring more particularly to the drawings, reference numeral 12 indicates a wheel balancing machine which has a rigid cabinet base 14 and a base flange 16 bolted to the floor by means of bolts 18. The top portion of wheel balancer 12 includes a tray 20 having plural compartments for containing balancing weights of different sizes and a console 22, which contains electronic circuitry and has input push buttons 24 and output indicators 26. Secured rigid to cabinet base 14 by means of brackets 28 is a rigid elongate housing indicated generally at 30. As seen most clearly in FIG. 3, housing 30 is of square or box cross-sectional shape and has a bottom wall 32, a top wall 34 and opposite side walls 36 and 38. The inner surfaces of the walls define a generally square elongate passage 40 which extends throughout the length of the housing.

Housing 30 is preferably formed of a stock shape such as a nominal 4 inch by 4 inch steel box section. Such shape is extremely strong and substantially nondeformable with respect to the forces imposed on it in the present environment. The high strength, nondeformable character of housing 30, as will be explained hereinbelow in more detail, assures that forces imposed on the transducer are an accurate function of wheel imbalance.

As can be seen in FIG. 1, a portion of housing 30 extends beyond the side wall of cabinet base 14 in order to facilitate mounting of a wheel/tire assembly 42 onto a shaft 44 that is carried within housing 30. At the end of shaft 42 that extends exterior of cabinet base 14 there is a flange member 46 which in combination with a conventional clamping mechanism 45 affords firm attachment of wheel/tire assembly 42 to shaft 44. On the opposite end of shaft 44 and within cabinet base 14 there is a sheave 48 with which a drive belt (not shown) is engaged, a portion of driven belt remote from sheave 48 being driven by a motor (not shown).

In accordance with the invention there is a first bearing block 50 mounted at the end of housing 30 adjacent sheave 48 and a second bearing block 52 mounted in the opposite end of the housing. Because the bearing blocks, the mounts therefor and the transducers associated therewith are substantially identical, a description of one will suffice for a description of both.

Centrally of bearing block 50 is supported a shaft bearing 54 which supports shaft 44 for rotation relative to the bearing block. Typically, shaft bearing 54 is positioned so that the axis of rotation of shaft 44 is substantially coterminous with the central longitudinal axis of housing 30. As can be seen in FIG. 3, bearing block 50 is sized and dimensioned with respect to passage 40 so as to define a gap 56 between the periphery of the bearing block and the internal wall that defines the central housing passage. Except for the mounting spacer that supports bearing block 50 within the central passage, it is desirable that gap 56 extend throughout the entire periphery of the bearing block, there being no requirement, however, that gap 56 be uniform throughout the periphery.

For mounting bearing block 50 within passage 14 there is at least one passive spacer mount 58 and an active spacer mount 60. As viewed in FIG. 3, the spacer mounts 58 and 60 are disposed at circumferentially limited regions that are symmetrical of the axis of shaft 44. Such disposition is desirable but not essential. Passive spacer mount 58 is of generally cylindrical form and defines a central bore 62. At one end of passive spacer mount 58 there are symmetrical excisions to form a diametrically extending shoulder 64. The lower surface of shoulder 64 is smaller than the cross sectional area of the cylindrical portion of passive spacer mount 58 so that correct alignment of the passive spacer with respect to wall 32 can be had, notwithstanding the fact that the internal surface of the wall may not be perfectly flat.

Wall 32 is formed with a bore 66 which is approximately equal in diameter to bore 62 formed in passive spacer 58. A side surface 68 of bearing block 50 is provided with an internally threaded hole 70 and engaged in hole 70 is a threaded stud 72, the stud having an external diameter suitable for passage through bores 62 and 66. Externally of housing wall 32 a nut 74 is threadedly engaged with stud 72 so that the tension on the stud and the compressive force on the passive spacer 58 can be adjusted as desired.

In order firmly to support bearing block 50 within housing passage 40, it is desirable that bearing block surface 68 and the upper surface of passive spacer mount 58 be machined substantially smooth and perpendicular to the axis of threaded stud 72. This can be readily achieved because both the bearing block and the passive spacer are small parts and are readily machined to produce such flat surfaces.

Bearing block 50 has a second internally threaded hole 76 which preferably lies in the same plane transverse to shaft 44 in which threaded hole 70 lies. Holes 70 and 76 are normal to side surface 68 and each of the holes is surrounded by a portion of the side surface. A threaded stud 78, equivalent to threaded stud 72, extends through active mount 60 into threaded engagement with hole 76, a nut 80 being provided on the external surface of wall 32. Active mount 60 is of composite construction and includes a piezoelectric body 82 which is formed of suitable ceramic material or the like having appropriate physical and electrical characteristics. The piezoelectric body is preferably of disc or cylindrical form and is provided with a central bore 84 for receiving stud 78 therethrough. Piezoelectric body 82 has an upper face which intimately contacts bearing block surface 68 and a lower face which is typically parallel to the upper face. Contacting the lower face of the piezoelectric body is an electrode 86. The electrode is in intimate contact with the lower face of piezoelectric body 82 so that in response to compression or expansion of the piezoelectric body, a voltage appears between electrode 86 and bearing block 50. As is known, such electric signal is representative of the amount of axial force applied to the body.

Underlying electrode 86 is an insulative layer 88 and underlying the insulative layer is a rigid supplemental spacer body 90. Supplemental spacer body 90 is preferably of cylindrical shape equivalent in diameter to piezoelectric body 82. The supplemental spacer body is excised at its lower extremity, as is the case with the excisions on passive mount 58, to form a diametrically extending shoulder 92 which cooperates with the inner surface of wall 32 as previously described.

In fabricating a transducer mount in accordance with the present invention, all parts that require any significant machining are relatively small so that the machining can proceed without difficulty. Additionally, the excisions that define diametrically extending shoulders 64 and 92 permit fabrication of the device without any special machining to the wall surface that defines central passage 40. This is an important advantage because a typical box section lacks perfectly smooth inner surfaces.

In operation, a wheel/tire assembly 42 is mounted on the outward extending portion of shaft 44 in contact with flange fitting 46 by means of clamp mechanism 45 so that the wheel/tire assembly is concentric of the shaft. Power is applied to the shaft and eccentricities in the wheel/tire assembly impose imbalanced forces on shaft 44. The direction of the imbalanced forces continuously changes as the shaft rotates. Such forces are transmitted through shaft 44 and bearings 54 to bearing blocks 50 and 52. A component of such forces is applied in a direction axially of threaded stud 78 so as to apply varying compressive forces to piezoelectric body 82 which forces are converted to electrical signals and processed by electronic techniques well documented in the prior art. Such forces occur along an axis indicated by arrows 94 in FIG. 5. Although passive spacer mount 58 is substantially rigid it has sufficient elasticity, particularly in view of the relatively high forces induced in response to rotation of the shaft and the wheel/tire assembly, to permit variation in the compressive forces applied to the piezoelectric bodies. Imbalanced forces in the wheel/tire assembly impose forces on the passive spacer mount along an axis indicated by arrows 96 which axis is in the same plane perpendicular to shaft 44 in which the forces indicated by arrows 94 are imposed. Because of the substantial rigidity and nondeformability of housing 52, the forces applied to the two piezoelectric bodies are substantially solely a function of the wheel imbalance and not of any deformation of any parts of the machine.

The imbalanced forces in wheel/tire assembly 42 experience simple harmonic motion in response to rotation of the assembly. Such motion is sensed by the transducers and the transducers each produce a sine wave. The sine waves are processed by electronic circuitry in console 22, and output indicators 26 are employed to determine the magnitude and position of balancing weights to be installed on wheel/tire assembly 42 to counteract imbalanced forces therein.

Because nuts 74 and 80 are externally accessible, appropriate tension on studs 72 and 78 can be established so as to impose on piezoelectric body 82 a suitable amount of preloading. Headed bolts can be used in place of studs 72 and 78 and nuts 74 and 80 provided that holes 70 and 76 have sufficient depth that the ends of the bolts are clear of the bottom of the holes. Additionally, the system retains the bearing blocks centrally of passageway 40 and out of contact with the walls that form the passageway so as to eliminate any extraneous signals.

It is preferred that active spacer 60 associated with bearing block 50 and the equivalent active spacer associated with bearing block 52 be axially aligned with one another, a desideratum that simplifies processing of the electric signals produced by the two active spacers. It can be seen in FIG. 2 that bearing blocks 50 and 52 are adjacent opposite ends of housing 30. Such location of the bearing blocks facilitates repair or maintenance of the transducer mounting system without requiring complete disassembly of the apparatus or removal of shaft 44 therefrom.

Although the preferred embodiment of the invention shown in the appended drawings has passive spacer mount 58 and active spacer mount 60 extending from the same side surface 68 of bearing block 50, such spatial relation is not essential. For example, installation of the passive spacer mount and the active spacer mount on diametrically opposite sides of the bearing block produces good results. Additionally, more than one passive spacer body 58 can be provided. It is desirable in all cases, however, that the number and position of the spacer bodies installed to support bearing blocks 50 and 52 be uniform and axially aligned with one another.

Thus it will be seen that the present invention provides a transducer mounting structure which is rugged, simple and which is composed of a small number of parts. The inherent rigidity of housing 30 combines with characteristics of bearing blocks 50 and 52, passive spacer mount 58, and active spacer mount 60 combine to produce a synergistic result. Moreover, because of the external accessibility of nuts 74 and 82, the forces present in the transducer can be accurately established even while the equipment is in operation. Finally, the small number of parts and the locations thereof facilitate repair or replacement should such become necessary.

Although one embodiment of the invention has been shown and described, it will be obvious that other adaptations and modifications can be made without departing from the true spirit and scope of the invention.

What is claimed is:

1. In a wheel balancing machine of a type having a driven shaft adapted to carry a wheel/tire assembly at one end thereof for rotation with the driven shaft, an improved mounting structure for supporting said shaft to provide electric signals representative of dynamic forces imposed thereon by weight imbalance during rotation of said wheel/tire assembly and shaft, said mounting structure comprising an elongate, rigid, multi-sided housing disposed about said shaft, a bearing block disposed about said shaft at each end of said housing, bearings within said bearing blocks for receiving said shaft for rotation with respect to said housing, spacer means supporting each said block from a given side of said rigid housing to provide an uninterrupted peripheral gap extending around said blocks and defined between the inner wall surface of said rigid housing and the outer periphery of said blocks exclusive of that portion of said outer periphery disposed adjacent said given side of said housing, said bearing blocks remaining otherwise decoupled from and independent of each other and of said housing to inhibit movement of one from effecting movement in the other, said spacer means comprising a pair of spacer units at each end of said rigid housing, each said pair including both an active and a passive spacer unit supporting a given one of said bearing blocks from said given side of said rigid housing and in spaced relation to the inner wall of said rigid housing, each said active unit including a force transducer for sensing dynamic imbalance forces applied thereto.

2. In a wheel balancing machine according to claim 1 wherein said spacer units include elongate fastening means serving to bolt each of said bearing blocks respectively to an associated one of the opposite ends of said housing.

3. In a wheel balancing machine according to claim 1 in which said multi-sided rigid housing comprises four flat mutually perpendicular sides forming a box-shaped housing.

4. In a wheel balancing machine of a type having a driven shaft adapted to carry a wheel/tire assembly at one end thereof for rotation with the driven shaft, an improved mounting structure for supporting said shaft in a manner providing electric signals representative of dynamic forces imposed thereon by weight imbalance during rotation of said wheel/tire assembly and shaft, said mounting structure comprising an elongate, rigid, multi-sided housing disposed about said shaft, a bearing block disposed about said shaft at each end of said housing, bearings within each said bearing block for receiving said shaft for rotation with respect to said housing, spacer means supporting said blocks from only one given side of said rigid housing to provide an uninterrupted gap defined between the other sides of said rigid housing and said blocks, said one given side being common to said spacer means at both said blocks, said uninterrupted gap extending around the periphery of said block exclusive of that portion of the periphery of said blocks disposed adjacent said one given side of said rigid housing, said bearing blocks remaining otherwise decoupled from and independent of each other and of said housing to inhibit movement of one from affecting movement in the other, said spacer means comprising a pair of spacer units at each end of said rigid housing, each said pair including both an active and a passive spacer unit supporting a given one of said bearing blocks from said rigid housing and in spaced relation to the inner walls of said rigid housing, each said active unit including a force transducer for sensing dynamic imbalance forces applied thereto.

* * * * *